United States Patent
Ziche

(10) Patent No.: US 7,071,278 B2
(45) Date of Patent: Jul. 4, 2006

(54) CROSS-LINKABLE MATERIALS BASED ON ORGANOSILICON COMPOUNDS

(75) Inventor: Wolfgang Ziche, Diera (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/491,611

(22) PCT Filed: Oct. 2, 2002

(86) PCT No.: PCT/EP02/11097

§ 371 (c)(1),
(2), (4) Date: Apr. 2, 2004

(87) PCT Pub. No.: WO03/035761

PCT Pub. Date: May 1, 2003

(65) Prior Publication Data

US 2004/0266967 A1     Dec. 30, 2004

(30) Foreign Application Priority Data

Oct. 18, 2001    (DE) .............................. 101 51 477

(51) Int. Cl.
*C08G 77/08*    (2006.01)
(52) U.S. Cl. ................ 528/18; 528/901; 528/38; 528/34; 528/23; 524/588
(58) Field of Classification Search .............. 528/901, 528/18, 38, 34, 23; 524/588
See application file for complete search history.

(56) References Cited

U.S. PATENT DOCUMENTS

| | | | |
|---|---|---|---|
| 3,095,434 A | 6/1963 | Stamm et al. | |
| 3,525,778 A | 8/1970 | Lengnick | |
| 3,655,705 A | 4/1972 | Lengnick | |
| 4,042,612 A | 8/1977 | Magee, Jr. | |
| 5,073,586 A | 12/1991 | Berthet et al. | |
| 5,118,738 A | 6/1992 | Berthet et al. | |
| 5,849,864 A | 12/1998 | Carlson et al. | |
| 5,981,685 A | 11/1999 | Seshadri et al. | |
| 6,162,756 A | 12/2000 | Friebe et al. | |

FOREIGN PATENT DOCUMENTS

| | | |
|---|---|---|
| DE | 195 27 101 A1 | 12/1996 |
| EP | 0 528 508 A1 | 2/1993 |
| EP | 0 623 642 A2 | 11/1994 |
| EP | 0 850 254 B1 | 9/2002 |
| GB | 1348402 | 3/1974 |
| WO | WO 99/11369 | 3/1999 |

OTHER PUBLICATIONS

English Derwent Abstract AN 1997-035970 (04) corresp. to DE 195 27 101.
English Derwent Abstract AN 1994-343288 (43) corresp. to EP 0 623 642.
English Derwent Abstract AN 1997-181066 (17) corresp. to EP 085 254.
A.G. Davies Organotin Chemistry, VCH Publishing Company, Weinheim, 1997, Chapter 11.3 and Chapter 11.4.
High Molecular Report 1962, Ref. (H.5165/62)0.
English Abstract corresponding to High Molecular Report 1962m Ref.: (H.5165/62)0.
High Molecular Report 1979, Ref.: (H.2033/79).
CPI—Profile Booklet 1985, CPI Ref. 85-100157/17.
K.A. Andrianov, "Metalorgnic Polymers," 1965, p. 312.

*Primary Examiner*—Kuo-Liang Peng
(74) *Attorney, Agent, or Firm*—Brooks Kushman P.C.

(57) ABSTRACT

Crosslinkable compositions employing organosilicon compounds having at least two hydrolyzable groups, optionally a crosslinker, and optionally a compound containing basic nitrogen, include a crosslinking catalyst which is a reaction product of a phosphorus compound, a sulfur compound, and a tin compound. The compositions exhibit improved shelf life.

6 Claims, No Drawings

CROSS-LINKABLE MATERIALS BASED ON ORGANOSILICON COMPOUNDS

BACKGROUND OF THE INVENTION

1. Field of the Invention

The invention relates in particular to materials crosslinkable at room temperature and based on organosilicon compounds, e.g. so-called RTV-1 materials, and special tin compounds which can be used as a catalyst in these materials.

2. Background Art

The use of dialkyltin(IV) compounds as condensation catalysts in RTV-1 and RTV-2 silicone rubbers is generally known. In RTV-1 alkoxy materials, these tin compounds, however, have the disadvantage that they also catalyze the undesired cleavage of the siloxane chains by alcohol radicals ("equilibration"), terminal alkoxy groups of the polysiloxane chain forming which are no longer crosslinkable and hence sufficient crosslinking of the material no longer being possible; i.e. with use in the intended manner, no vulcanized product or an insufficiently stable vulcanized product is obtained. The shelf life, stated as the duration for which the RTV-1 material can be stored, without markedly losing its properties, is drastically reduced by the equilibration.

The methods of choice for increasing the shelf life are to date replacement of the tin catalyst by a titanium catalyst. The disadvantage here is the yellow coloration of the materials, with the result that only opaque but not translucent materials are possible.

reduction in the amount of the tin catalyst.

use of less aggressive tin catalysts, for example tin chelate catalysts. An excess of chelate compound, such as, for example acetylacetonate, is necessary; however, this is volatile, toxicologically unsafe and hazardous to health.

addition of alcohol scavengers which, owing to their high reactivity, react with alcohols. This addition is, however, expensive and generally impairs the adhesion behavior.

use of catalysts having Sn—O—P bonds, as described, for example, in EP-A 850 254, which are obtained by reacting phosphoric monoesters with organic tin compounds. However, it has been found that the very high acid number of the phosphorus compounds used, which have to be employed at least in equimolar amounts relative to the tin compound or in an excess, cause adhesion problems which are evident in particular when the adhesive joints are in contact with water. Moreover, compounds having Sn—O—P bonds, obtained from phosphorus diesters, are disclosed in U.S. Pat. No. 3,525,778 and U.S. Pat. No. 3,655,705.

Dialkyldiacyltin catalysts blocked with sulfonic acid and intended for polyurethanes are known, the activation being effected via amines. In this context, reference may be made, for example, to U.S. Pat. No. 5,849,864 and WO99/11369, Ashland Chemical Company. Organotin-based RTV-2 curing agents (catalyst-crosslinking agent compositions) are described in DE-A 195 27 101 and may also contain organic acids as reaction time regulators, the reaction time regulators being intended to improve the reactivity of the claimed catalyst-crosslinking agent compositions.

The use of Sn—O—SO$_2$R-containing compounds, which can be prepared, for example, from alkyltin oxides and sulfonic acids, in, inter alia, condensation-crosslinking polymer systems is described. In this context, reference may be made, for example, to U.S. Pat. No. 3,095,434 and U.S. Pat. No. 5,981,685. The use of the claimed catalysts with Sn sulfonate units for RTV silicone systems is not described in the examples. Especially, alkoxy-RTV-1 systems with their specific problems regarding the shelf life and the necessity of cocatalyzing additives are not described.

EP-A 623 642 describes the addition of acids, including sulfonic acids, for stabilizing RTV-1 acetoxy materials if the polymers contained therein have been prepared by anionic polymerization of cyclic structures and, for example, phosphoric acid was used for neutralizing the basic polymerization catalysts and the materials therefore contain, for example, alkali metal phosphates.

The use of reaction products of sulfonic acids with amines or basic fillers is known in filled RTV systems, in order to facilitate the dispersing of the fillers and to obtain an elastomer having a low modulus. In this context, reference may be made, for example, to U.S. Pat. No. 5,073,586 and U.S. Pat. No. 5,118,738.

SUMMARY OF THE INVENTION

The present invention pertains to crosslinkable compositions employing organosilicon compounds having at least two hydrolyzable groups. and which employ unique tin catalysts which are the reaction product of a tin compound and both a sulfur compound and a phosphorus compound.

DESCRIPTION OF THE PREFERRED EMBODIMENTS

The invention relates to crosslinkable materials based on organosilicon compounds having at least two hydrolyzable groups, wherein at least one organotin compound (C) is contained as a catalyst, the organotin compound (C) being obtainable by reacting phosphorus compounds (i) having C—P(=O)(OH) units and sulfur compounds (ii) having —SO$_3$H groups and tin compounds (iii) containing units of the formula $$R_a(XR')_b SnX_{(4-a-b)/2} \qquad (III),$$

in which

R may be identical or different and are monovalent, optionally substituted hydrocarbon radicals which may be interrupted by oxygen atoms, X may be identical or different and are —O— or —S—, R' may be identical or different and are a hydrogen atom or monovalent, optionally substituted hydrocarbon radicals which may be interrupted by oxygen atoms, or optionally substituted silyl radicals, a is 0, 1, 2 or 3 and b is 0, 1, 2 or 3, with the proviso that the sum a+b is less than or equal to 4.

Radical R is preferably a hydrocarbon radical having 1 to 18 carbon atoms, particularly preferably an alkyl radical having 1 to 12 carbon atoms, in particular the n-butyl and the n-octyl radical.

Examples of radicals R are alkyl radicals, such as the methyl, ethyl, n-propyl, isopropyl, 1-n-butyl, 2-n-butyl, isobutyl; tert-butyl, n-pentyl, isopentyl, neopentyl and tert-pentyl radical; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl and cycloheptyl radical and methylcyclohexyl radicals; alkenyl radicals, such as the vinyl, 1-propenyl and 2-propenyl radical; aryl radicals, such as the phenyl, naphthyl, anthryl and phenanthryl radical; alkaryl radicals, such as the o-, m- and p-tolyl radicals; xylyl radicals and ethylphenyl radicals; and aralkyl radicals, such as the benzyl radical, and the α- and the β-phenylethyl radical.

Examples of substituted radicals R are the methoxyethyl, ethoxyethyl and ethoxyethoxyethyl radical.

X is preferably an oxygen atom.

Radical R' is preferably a hydrogen atom and hydrocarbon radicals optionally substituted by alkoxy radicals and/or amino radicals and having 1 to 18 carbon atoms, particularly preferably alkyl and aryl radicals having 1 to 18 carbon atoms, in particular the methyl and ethyl radical.

Examples of radicals R' are the examples mentioned for R and the methoxyethyl, ethoxyethyl, methoxy-ethoxyethyl, aminoethoxyethyl and aminopropyl radical.

Examples of tin compounds (iii) which can be used for the preparation of the tin compounds (C) used according to the invention are tetra-n-butyldimethoxystannoxane, tetra-n-butyldiethoxystannoxane, di-n-butyltin oxide, tetra-n-butyldihydroxystannoxane, di-n-butyldimethoxystannane, tetra-n-octyldihydroxystannoxane, di-n-octyldimethoxystannane, octa-n-butyldiethoxytetrastannoxane, tetra-n-butyldimethoxystannoxane, tetra-n-butyldiethoxystannoxane and di-n-butyldimethoxystannane being preferred and tetra-n-butyldimethoxystannoxane and di-n-butyldimethoxystannane being particularly preferred.

The phosphorus compounds (i) which can be used for the preparation of the tin compounds (C) used according to the invention are preferably those of the formula

$$O=PR^1{}_m Y_n(OH)_{3-m-n} \quad (I)$$

in which
R$^1$ may be identical or different and are optionally substituted hydrocarbon radicals having 1 to 30 carbon atoms which may be interrupted by oxygen atoms,
Y is —OR$^2$, —NR$^2{}_2$ or a hydrogen atom, in which R$^2$ may be identical or different and has a meaning mentioned for R$^1$, or may be an optionally substituted silyl radical,
n is 0 or 1 and
m is 1 or 2, with the proviso that the sum m+n is 1 or 2.

Examples of radicals R$^1$ and R$^2$ are, independently of one another, the examples mentioned for radical R.

Examples of substituted radicals R$^1$ and R$^2$ are, independently of one another, hydroxyalkyl, haloalkyl and cyanoalkyl radicals and radicals of the structure —(CH$_2$CH$_2$O)$_z$R", in which R" is a methyl, ethyl or butyl radical and z is an integer from 1 to 18.

Radical R$^1$ is preferably an aryl, alkaryl or alkyl radical, particularly preferably an aryl or alkyl radical, in particular an octyl, benzyl or phenyl radical.

Radical R$^2$ is preferably an aryl or alkyl radical, particularly preferably an alkyl radical, in particular a methyl, ethyl or butyl radical.

Radical Y is preferably an alkoxy or aryloxy radical, particularly preferably an alkoxy radical, in particular a methoxy, ethoxy or butoxy radical.

m preferably has the value 1.

n preferably has the value 0.

Examples of phosphorus compounds (i) are phenylphosphonic acid, benzenephosphonous acid, p-aminophenylphosphonic acid, n-octylphosphonic acid and 2-amino-8-phosphonooctanoic acid, phenylphosphonic acid and n-octylphosphonic acid being preferred.

The sulfur compounds (ii) which can be used for the preparation of the tin compounds (C) used according to the invention are preferably those of the formula

$$R^3—S(=O)_2OH \quad (II)$$

in which
R$^3$ may be identical or different and are amine radicals bonded via nitrogen or are monovalent, optionally substituted hydrocarbon radicals which may be interrupted by —S(=O)$_2$—.

Radical R$^3$ is preferably a hydrocarbon radical optionally substituted by —SO$_3$H and having 1 to 40 carbon atoms, which may be interrupted by —S(=O)$_2$—, particularly preferably an alkyl or aryl radical having 1 to 40 carbon atoms, in particular an alkyl-substituted aryl radical having 7 to 40 carbon atoms.

Examples of radicals R$^3$ are the examples mentioned for R and —NH$_2$, —C$_6$H$_4$—SO$_3$H and —C$_4$H$_8$—SO$_3$H.

Examples of sulfur compounds (ii) are dodecylbenzenesulfonic acid, p-toluenesulfonic acid, benzenesulfonic acid and 1,3-benzenedisulfonic acid, dodecylbenzenesulfonic acid and p-toluenesulfonic acid being preferred and dodecylbenzenesulfonic acid being particularly preferred.

The compounds (i), (ii) and (iii) are each commercial products or can be prepared by processes known in organic chemistry.

The organotin compounds (C) used according to the invention may be both stannanes and oligomeric or polymeric tin compounds, such as, for example, stannoxanes.

The catalysts (C) used according to the invention are preferably stannanes or linear stannoxanes.

Examples of catalysts (C) used according to the invention are Oct$_2$Sn(OP(=O)Ph(OH))(OSO$_2$—C$_6$H$_4$—CH$_3$), Oct$_2$Sn(O—P(=O)Oct(OEt))—O—SnOct$_2$(OSO$_2$—C$_6$H$_4$—C$_{12}$H$_{23}$), Bu$_2$Sn(O—P(=O)Oct(OH))—O—SnBu$_2$(OSO$_2$—C$_6$H$_4$—C$_{12}$H$_{23}$), Bu$_2$Sn[O—P(=O)Oct(O-Bu$_2$Sn(OEt))]—O—SnBu$_2$(OSO$_2$—C$_6$H$_4$—C$_{12}$H$_{23}$), Oct$_2$Sn(O—P(=O)Oct(OH))—O—SnOct$_2$(OSO$_2$—C$_6$H$_4$—C$_{12}$H$_{23}$), Oct$_2$Sn(O—P(=O)Oct(OEt))—(O—SnOct$_2$)$_9$(OSO$_2$—C$_6$H$_4$—C$_{12}$H$_{23}$), Oct$_2$Sn(O—P(=O) Oct(OEt))—O—SnOct$_2$(OSO$_2$—C$_6$H$_4$—C$_{12}$H$_{23}$), Bu$_2$Sn[O—P(=O)Oct(O-Bu$_2$Sn(OEt)]—O—SnBu$_2$(OSO$_2$—C$_6$H$_4$—C$_{12}$H$_{23}$), Bu$_2$Sn(O—P(=O)Oct(OH))—O—SnBu$_2$(OSO$_2$—C$_6$H$_4$—C$_{12}$H$_{23}$) and Oct$_2$Sn(O—P(=O)Oct(OH))—O—SnOct$_2$(OSO$_2$—C$_6$H$_4$—C$_{12}$H$_{23}$) being preferred and Oct$_2$Sn(O—P(=O)Oct(OH))—O—SnOct$_2$(OSO$_2$—C$_6$H$_4$—C$_{12}$H$_{23}$) and Bu$_2$Sn(O—P(=O)Oct(OH))—O—SnBu$_2$(OSO$_2$—C$_6$H$_4$—C$_{12}$H$_{23}$) being particularly preferred, in which Et is an ethyl radical, Bu is an n-butyl radical and Oct is an n-octyl radical.

The present invention furthermore relates to organotin compounds obtainable by reacting phosphorus compounds (i) having C—P(=O) (OH) units and sulfur compounds (ii) having —SO$_3$H groups and tin compounds (iii) containing units of the formula

$$R_a(XR')_b SnX_{(4-a-b)/2} \quad (III),$$

in which R, X, R', a and b have one of the abovementioned meanings, with the proviso that the sum a+b is less than or equal to 4.

The organotin compounds (C) according to the invention or used according to the invention can be prepared by procedures known in organic chemistry, such as, for example, by reacting the corresponding organotin compounds with mixtures of sulfonic acids or sulfonic acid derivatives and phosphonic acids or phosphonic acid derivatives. In this context, reference may be made, for example, to A. G. Davies, *Organotin Chemistry*, VCH Verlagsgesellschaft, Weinheim, 1997, Section 11.3 (Reactions with P-containing acids) and 11.4 (Reactions with P-containing acids).

The organotin compound (C) according to the invention or used according to the invention is preferably prepared by reacting the compounds (i), (ii) and (iii) at a temperature in the range from 0 to 150° C., particularly preferably from 20 to 60° C., and at ambient pressure, i.e. from about 900 to 1 100 hPa.

In the reaction, according to the invention, the compounds (i), (ii) and (iii) phosphorus compound (i) is used in amounts of, preferably, from 0.1 to 2.0 mol, particularly preferably from 0.2 to 1.0 mol, based in each case on 1 mol of tin atoms of the tin compound (iii).

In the reaction, according to the invention, of the compounds (i), (ii) and (iii), sulfonic acid (ii) is used in amounts of, preferably, from 0.05 to 1.5 mol, particularly preferably from 0.1 to 0.5 mol, based in each case on 1 mol of tin atoms of the tin compound (iii).

The preparation of the catalysts (C) used according to the invention is also possible in situ by direct addition of the starting materials (i), (ii) and (iii) to the other components of the crosslinkable materials, which is to be included in the disclosure of the present invention but is not preferred. If the catalysts (C) according to the invention are to be prepared in situ, it is preferable if basic components are added only after the in situ reaction of the tin compound (iii), of the sulfur compound (ii) and of the phosphorus compound (i).

The materials according to the invention which are based on organosilicon compounds preferably contain a compound (D) having basic nitrogen, in addition to organotin compound (C).

The compounds (D) having basic nitrogen may be amines, nitrogen-containing heterocycles or amino-functional organosilicon compounds, the latter being preferred.

Examples of aminofunctional organosilicon compounds (D) are silanes having basic nitrogen, organosiloxanes having basic nitrogen, such as, for example, those of the formula (V), in which at least one radical $R^6$ has the meaning of a hydrocarbon radical substituted by amino groups.

The organosilicon compounds (D) having basic nitrogen are preferably those of the formula

$$(R^9O)_{4-g}SiR^{10}_g \qquad (IV),$$

in which
$R^9$ may be identical or different and have one of the meanings mentioned above for R',
$R^{10}$ may be identical or different and are monovalent; optionally substituted hydrocarbon radicals having basic nitrogen, and
g is 1, 2, 3 or 4,
and the partial hydrolysis products thereof.

The partial hydrolysis products may be partial homohydrolysis products, i.e. partial hydrolysis products of one type of organosilicon compound of the formula (IV), as well as partial cohydrolysis products, i.e. partial hydrolysis products of at least two different types of organosilicon compounds of the formula (IV).

If the compounds (D) optionally used in the materials according to the invention are partial hydrolysis products of organosilicon compounds of the formula (IV), those having up to 6 silicon atoms are preferred.

Examples of radical $R^9$ are the examples mentioned above for radical R'. Radical $R^9$ is preferably a hydrogen atom and alkyl radicals, particularly preferably a hydrogen atom and alkyl radicals having 1 to 4 carbon atoms, in particular a hydrogen atom, the methyl radical and the ethyl radical.

Examples of radicals $R^{10}$ are aminomethyl, 1-aminoethyl, 3-aminopropyl, 3-(2-aminoethyl)aminopropyl, aminoethylaminoethylaminopropyl and cyclohexylaminopropyl radicals.

Radical $R^{10}$ is preferably a 3-aminopropyl, 3-(2-aminoethyl)aminopropyl, aminoethylaminoethylaminopropyl and cyclohexylaminopropyl radical, the 3-aminopropyl and 3-(2-aminoethyl)aminopropyl radical being particularly preferred.

Examples of compounds (D) optionally used according to the invention and having basic nitrogen are 3-aminopropyltrimethoxysilane, 3-aminopropyltriethoxysilane, 3-(2-aminoethylamino)propyltrimethoxysilane, 3-(2-aminoethylamino)propyltriethoxysilane, 3-(N,N-diethyl-2-aminoethylamino)propyltrimethoxysilane, 3-(N,N-diethyl-2-aminoethylamino)propyltriethoxysilane, 3-(cyclohexylamino)propyltrimethoxysilane, 3-(cyclohexylamino)propyltriethoxysilane, aminomethyltrimethoxysilane and partial hydrolysis products of said alkoxy-functional organosilicon compounds.

The compounds (D) optionally used according to the invention are commercial products or can be prepared by processes known in organic chemistry.

In addition to the organotin compounds (C) used according to the invention as condensation catalysts and optionally used compounds (D) having basic nitrogen, the materials according to the invention may contain all components which have also been used to date for the preparation of organopolysiloxane materials crosslinkable at room temperature. The hydrolyzable groups which the organosilicon compounds used and involved in the crosslinking reaction may have may be any desired groups, such as acetoxy, oximato and organyloxy groups, in particular alkoxy radicals, such as ethoxy radicals, alkoxyethoxy radicals and methoxy radicals. Furthermore, the organosilicon compounds may be both siloxanes (≡Si—O—Si≡ structures) and silcarbanes (≡Si—R'''—Si≡ structures in which R''' is a divalent hydrocarbon radical which is optionally substituted or interrupted by hetero atoms) or copolymers thereof.

The crosslinkable materials according to the invention are preferably those which contain
(A) organopolysiloxanes having at least two hydrolyzable radicals selected from acetoxy, oximato and organyloxy groups, optionally
(B) crosslinking agents having at least three hydrolyzable radicals selected from acetoxy, oximato and organyloxy groups, and/or partial hydrolysis products thereof,
(C) organotin compound obtainable by reacting phosphorus compounds (i), sulfur compounds (ii) and tin compounds (iii) and optionally
(D) compounds (D) having basic nitrogen.

The organopolysiloxanes used according to the invention and having at least two hydrolyzable groups (A) are preferably those of the general formula

$$(R^5O)_{3-d}R^6_dSiO—[R^6_2SiO]_e—SiR^6_d(OR^5)_{3-d} \qquad (V),$$

in which
d is 0, 1 or 2,
$R^6$ are identical or different SiC-bonded hydrocarbon radicals having 1 to 18 carbon atoms, which are optionally substituted by halogen atoms, ether groups, ester groups, epoxy groups, mercapto groups, cyano groups, amino groups or (poly)glycol radicals, the latter being composed of oxyethylene and/or oxypropylene units, and $R^5$ may be identical or different and have a meaning mentioned for R', e is an integer from 10 to 10,000 preferably from 100 to 3,000, particularly preferably from 400 to 2,000, with the proviso that d may have the value 2 only when $R^5$ is a hydrogen atom.

Examples of radicals $R^6$ are the examples mentioned above for radical R.

Radical $R^6$ is preferably an alkyl radical, particularly preferably an alkyl radical having 1 to 4 carbon atoms, in particular the methyl radical.

Examples of radicals $R^5$ are the examples mentioned above for radical R'.

Radical $R^5$ is preferably a hydrogen atom and an alkyl radical, particularly preferably a hydrogen atom and an alkyl radical having 1 to 4 carbon atoms, in particular a hydrogen atom, the methyl radical and the ethyl radical.

The average value for the number e in formula (V) is preferably chosen so that the organopolysiloxane of the formula (V) has a viscosity of from 1,000 to 2,500,000 mPa·s, particularly preferably from 4,000 to 800,000 mPa·s, measured in each case at a temperature of 25° C.

Although not shown in formula (V) and not evident from the designation diorganopolysiloxane, up to 10 mol percent of the diorganosiloxane units may be replaced by other siloxane units, such as $R^6_3SiO_{1/2}$, $R^6SiO_{3/2}$ and $SiO_{4/2}$ units, in which $R^6$ has the meaning mentioned above therefor.

Examples of the organopolysiloxanes used in the materials according to the invention and having at least two organyloxy radicals on each terminal group (A) are $(MeO)_2MeSiO[SiMe_2O]_{200-2000}SiMe(OMe)_2$,
$(EtO)_2MeSiO[SiMe_2O]_{200-2000}SiMe(OEt)_2$,
$(MeO)_2ViSiO[SiMe_2O]_{200-2000}SiVi(OMe)_2$ and
$(EtO)_2ViSiO[SiMe_2O]_{200-2000}SiVi(OEt)_2$,
$(MeO)_2(H_2N-CH_2CH_2CH_2)SiO[SiMe_2O]_{200-2000}Si(CH_2CH_2CH_2-NH_2)(OMe)_2$, in which Me is a methyl radical, Et is an ethyl radical and Vi is a vinyl radical.

The organosilicon compounds used in the materials according to the invention and having at least two hydrolyzable groups (A) are commercial products or can be prepared by processes known in silicon chemistry, for example by reacting α, ω-dihydroxypolyorganosiloxanes with corresponding organyloxysilanes.

The crosslinking agents (B) optionally used in the materials according to the invention may be any desired crosslinking agents known to date and having at least three hydrolyzable radicals, such as, for example, silanes or siloxanes having at least three organyloxy groups.

The crosslinking agents (B) optionally used in the materials according to the invention are preferably organosilicon compounds of the formula $(R^7O)_{4-f}SiR^8_f$ (VI), in which $R^7$ may be identical or different and have one of the meanings mentioned above for R', $R^8$ has a meaning mentioned above for R and f is 0 or 1, and the partial hydrolysis products thereof.

The partial hydrolysis products may be partial homohydrolysis products, i.e. partial hydrolysis products of one type of organosilicon compound of the formula (VI), as well as partial cohydrolysis products, i.e. partial hydrolysis products of at least two different types of organosilicon compounds of the formula (VI).

If the crosslinking agents (B) optionally used in the materials according to the invention are partial hydrolysis products of organosilicon compounds of the formula (VI), those having up to 6 silicon atoms are preferred.

Examples of radicals $R^7$ are the examples mentioned above for radical R'. Radical $R^7$ is preferably a hydrogen atom and an alkyl radical, particularly preferably a hydrogen atom and an alkyl radical having 1 to 4 carbon atoms, in particular a hydrogen atom, the methyl radical and the ethyl radical.

Examples of radical $R^8$ are the examples mentioned above for radical R, hydrocarbon radicals having 1 to 12 carbon atoms being preferred and the methyl and the vinyl radical being particularly preferred.

The crosslinking agents (B) optionally used in the materials according to the invention are particularly preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltrimethoxysilane, 3-(glycidyloxy)propyltriethoxysilane, 1,2-bis(trimethoxysilyl)ethane, 1,2-bis(triethoxysilyl)ethane and partial hydrolysis products of said alkoxy-functional organosilicon compounds, such as, for example, hexaethoxydisiloxane.

The crosslinking agents (B) optionally used in the materials according to the invention are commercial products or can be prepared by processes known in silicon chemistry.

If the materials according to the invention contain crosslinking agents (B), they do so in amounts of, preferably, from 0.01 to 20 parts by weight, particularly preferably from 0.5 to 10 parts by weight, in particular from 1.0 to 5.0 parts by weight, based in each case on 100 parts by weight of organopolysiloxane (A). Inter alia, it is possible to dispense with the addition of crosslinking agents (B) or to reduce the amount if, for example, compounds having at least three hydrolyzable groups are used as component (D).

The materials according to the invention contain catalyst (C) in amounts of, preferably, from 0.001 to 5 percent by weight, particularly preferably from 0.05 to 3 percent by weight, in particular from 0.1 to 1 percent by weight, based in each case on 100 parts by weight of organopolysiloxane (A).

The materials according to the invention preferably contain component (D).

If the materials according to the invention contain component (D), they do so in amounts of, preferably, from 0.001 to 6 percent by weight, particularly preferably from 0.5 to 4 percent by weight, in particular from 1 to 3 percent by weight, based in each case on 100 parts by weight of organopolysiloxane (A).

In addition to the components (A), (B), (C) and optionally (D) described above, the materials according to the invention may contain further substances, such as plasticizers (E), fillers (F), adhesion promoters (G) and additives (H), it being possible for the additional substances (E) to (H) to be the same as those which have also been used to date in materials storable in the absence of moisture and crosslinkable on admission of moisture.

Examples of plasticizers (E) are dimethylpolysiloxanes which are liquid at room temperature and are endcapped by trimethylsilyloxy groups, in particular having viscosities in the range from 50 to 1 000 mPa·s, and high-boiling hydrocarbons, such as, for example, liquid paraffins.

The materials according to the invention contain plasticizers (E) in amounts of, preferably, from 0 to 300 parts by weight, particularly preferably from 10 to 200 parts by weight, in particular from 20 to 100 parts by weight, based in each case on 100 parts by weight of organopolysiloxane (A).

Example of fillers (F) are nonreinforcing fillers, i.e. fillers having a BET surface area of up to 50 $m^2/g$, such as quartz, diatomaceous earth, calcium silicate, zirconium silicate, zeolites, metal oxide powders, such as aluminum, titanium, iron or zinc oxides or mixed oxides thereof, barium sulfate, calcium carbonate, gypsum, silicon nitride, silicon carbide, boron nitride, glass powder and plastics powder, such as polyacrylonitrile powder; reinforcing fillers, i.e. fillers having a BET surface area of more than 50 $m^2/g$, such as pyrogenically prepared silica, precipitated silica, precipitated chalk, carbon black, such as furnace black and acetylene black, and silicon-aluminum mixed oxides having a large BET surface area; fibrous fillers, such as asbestos and plastics fibers. Said fillers may have been rendered hydrophobic, for example by the treatment with organosilanes or organosiloxanes or with stearic acid or by etherification of hydroxyl groups to give alkoxy groups. If fillers (E) are used, they are preferably hydrophilic pyrogenic silica and stearic acid-coated chalk.

The materials according to the invention contain fillers (F) in amounts of, preferably, from 0 to 300 parts by weight, particularly preferably from 1 to 200 parts by weight, in particular from 5 to 200 parts by weight, based in each case on 100 parts by weight of organopolysiloxane (A).

Examples of the adhesion promoters (G) used in the materials according to the invention are silanes and organopolysiloxanes having functional groups, such as, for example, those having glycidyloxypropyl or methacryloyloxypropyl radicals, and tetraalkoxysilanes. If, however, another component, such as, for example, siloxane (A) or crosslinking agent (B), has said functional groups, an addition of adhesion promoters can be dispensed with.

The materials according to the invention contain adhesion promoters (G) in amounts of, preferably, from 0 to 50 parts by weight, particularly preferably from 1 to 20 parts by weight, in particular from 1 to 10 parts by weight, based in each case on 100 parts by weight of organopolysiloxane (A).

Examples of additives (H) are pigments, dyes, fragrances, fungicides, antioxidants, compositions for influencing the electrical properties, such as conductive carbon black, flame retardant compositions, light stabilizers and compositions for increasing the skin formation time, such as silanes having an SiC-bonded mercaptoalkyl radical, cell-producing compositions, e.g. azodicarbonamide, heat stabilizers and thixotropic agents, such as, for example, phosphoric esters, and organic solvents, such as alkylaromatics.

The materials according to the invention contain additives (H) in amounts of, preferably, from 0 to 100 parts by weight, particularly preferably from 0 to 30 parts by weight, in particular from 0 to 10 parts by weight, based in each case on 100 parts by weight of organopolysiloxane (A).

The materials according to the invention are particularly preferably those which contain
(A) diorganopolysiloxane of the formula (V), optionally
(B) crosslinking agents of the formula (VI) and/or partial hydrolysis products thereof,
(C) organotin compound and
(D) compound of the formula (IV) having basic nitrogen.

In particular, the materials according to the invention are those which consist of (A) 100 parts by weight of polydiorganosiloxane of the formula (V),
(B) from 0.01 to 20 parts by weight of crosslinking agents of the formula (VI) and/or partial hydrolysis products thereof,
(C) from 0.05 to 3 parts by weight of organotin compound,
(D) from 0.01 to 4 parts by weight of compound of the formula (IV) having basic nitrogen,
(E) from 0 to 300 parts by weight of plasticizers,
(F) from 0 to 300 parts by weight of fillers,
(G) from 0 to 50 parts by weight of adhesion promoters and
(H) from 0 to 100 parts by weight of additives.

The individual components of the materials according to the invention may be in each case one type of such a component as well as a mixture of at least two different types of such components.

For the preparation of the materials according to the invention, all components of the respective material can be mixed with one another in any desired sequence. This mixing can be effected at room temperature and atmospheric pressure, i.e. from about 900 to 1 100 hPa. If desired, this mixing can, however, also be effected at higher temperatures, for example at temperatures in the range from 35° C. to 135° C.

The preparation of the materials according to the invention and the storage thereof must be carried out under substantially anhydrous conditions, since otherwise the materials may cure prematurely.

For the crosslinking of the materials according to the invention to give elastomers, the customary water content of the air is sufficient. The crosslinking can, if desired, also be carried out at temperatures higher or lower than room temperature, for example at from –5° to 15° C. or at from 30° to 50° C. Preferably, the crosslinking is carried out at a pressure of from 100 to 1 100 hPa, in particular at atmospheric pressure.

The present invention furthermore relates to moldings produced by crosslinking the materials according to the invention.

The crosslinkable materials according to the invention have the advantage that they are distinguished by a very long shelf life and a high crosslinking speed.

It was surprising that, by combining the sulfur-containing groups and the phosphorus-containing groups, crosslinkable materials having a considerably improved shelf life and substantially increased crosslinking speed are obtained.

Furthermore, the materials according to the invention have the advantage that colorless, translucent materials are obtained by using the organotin compounds (C).

The materials according to the invention can be used for all purposes for which materials storable in the absence of water and crosslinking on admission of water at room temperature to give elastomers can be used.

The materials according to the invention are therefore excellently suitable, for example, as sealing compounds for joints, including perpendicular joints, and similar empty spaces having an internal dimension of, for example, from 10 to 40 mm, for example of buildings, land vehicles, water vehicles and aircraft, or as adhesives or cementing materials, for example in window construction or in the production of aquaria or glass cabinets, and, for example, for the production of protective coatings, including those for surfaces exposed to the constant action of fresh or sea water, or antislip coatings, or of elastomeric moldings and for the insulation of electrical or electronic apparatuses.

In the examples described below, all viscosity data relate to a temperature of 25° C. Unless stated otherwise, the examples below are carried out at atmospheric pressure, i.e. at about 1 000 hPa, and at room temperature, i.e. at about 23° C., or at a temperature which is established on combining the reactants at room temperature without additional heating or cooling, and at a relative humidity of about 50%. Furthermore, all stated parts and percentages are based on weight, unless stated otherwise.

The shelf life of the RTV-1 alkoxy materials (=compounds) prepared in the following examples is determined from the skin formation time of the compounds, their vulcanization to give resilient rubbers and their Shore A hardness as a function of the storage time. The aging of the compounds is accelerated by storage at 100° C.

EXAMPLE 1

Preparation of Tin Catalyst 1

16 g of dodecylbenzenesulfonic acid and 6 g of benzenephosphonic acid are added to 40 g of a tin compound which was prepared by reacting 4 parts of tetraethoxysilane with 2.2 parts of dibutyltin diacetate, the methanol formed being removed in vacuo. A viscous, clear compound is obtained.

In a planetary mixer having vacuum equipment, 55.4 parts by weight of a polydimethylsiloxane having —OSi(OCH$_3$)$_2$(CH$_3$) terminal groups, which has a viscosity of 80,000 mPa·s, are mixed with 31.2 parts by weight of a polydimethylsiloxane having —OSi(CH$_3$)$_3$ terminal groups and a viscosity of 100 mPa·s and 4.0 parts by weight of methyltrimethoxysilane and 1.5 parts by weight of 3-aminopropyltrimethoxysilane in the absence of water. Thereafter, 8.0 parts by weight of pyrogenic silica having a BET surface area of 150 m$^2$/g (commercially available from Wacker-Chemie GmbH under the trade name "WACKER HDK® V15") are mixed in and finally 0.15 part by weight of the tin catalyst 1 described above is added. After homogenization in vacuo, the compound thus obtained is filled into moisture-tight containers and allowed to crosslink after the storage time stated in table 1. For this purpose, the compound thus obtained is applied in a 2 mm thick layer to a PE film and left to stand at 23° C. and 50% relative humidity. The vulcanization is assessed as good if the material has completely vulcanized after 24 hours.

In addition, the skin formation time is determined and the Shore A hardness of a 6 mm thick elastomer slab which was vulcanized for 7 days at 23° C. and 50% relative humidity is measured.

The results for the storage and vulcanization behavior are shown in table 1.

EXAMPLE 2

Preparation of Tin Catalyst 2

Di-n-butyltin oxide is refluxed in toluene with 1 mole equivalent of p-dodecylbenzenesulfonic acid monohydrate and 1 mole equivalent of benzenephosphonic acid, and the water of reaction is removed azeotropically. The residue is dissolved in a little methyltrimethoxysilane, and a highly viscous liquid is obtained.

The procedure described in example 1 is repeated, except that 0.15 part by weight of tin catalyst 2 is used instead of 0.15 part by weight of tin catalyst 1.

The results for the storage and vulcanization behavior are shown in table 1.

COMPARATIVE EXAMPLE 1

Preparation of Comparative Catalyst A 16 g of dodecylbenzenesulfonic acid are added to 40 g of a tin compound which was prepared by reacting 4 parts of tetraethoxysilane with 2.2 parts of dibutyltin diacetate, the methanol formed being removed in vacuo. A viscous, clear compound is obtained.

The procedure described in example 1 is repeated, except that 0.2 parts by weight of comparative catalyst A is used instead of 0.15 part by weight of tin catalyst 1.

The results for the storage and vulcanization behavior are shown in table 1.

COMPARATIVE EXAMPLE 2

Preparation of Comparative Catalyst B 8 g of benzenephosphonic acid are added to 40 g of tetra-n-octyldimethoxydistannoxane, the methanol formed being removed in vacuo. The residue is dissolved in a little methyltrimethoxysilane, and a viscous, clear compound is obtained.

The procedure described in example 1 is repeated, except that 0.2 part by weight of comparative catalyst B is used instead of 0.15 part by weight of tin catalyst 1.

The results for the storage and vulcanization behavior are shown in table 1.

EXAMPLE 3

In a planetary mixer having vacuum equipment, 55.4 parts by weight of a polydimethylsiloxane having —OSi(OCH$_3$)$_2$(CH$_3$) terminal groups, which has a viscosity of 80,000 mPa·s, are mixed with 31.2 parts by weight of a polydimethylsiloxane having —OSi(CH$_3$)$_3$ terminal groups and a viscosity of 100 mPa·s and 4.0 parts by weight of methyltrimethoxysilane and 0.2 part by weight of a tin compound, which was prepared by reacting 4 parts of tetraethoxysilane with 2.2 parts of dibutyltin diacetate, and 0.05 part by weight of benzenephosphonic acid (dissolved in methyltrimethoxysilane) and 0.1 part by weight of dodecylbenzenesulfonic acid in the absence of water and are stirred for 10 minutes. Thereafter, 8.0 parts by weight of pyrogenic silica having a BET surface area of 150 m$^2$/g (commercially available from Wacker-Chemie GmbH under the trade name "WACKER HDK® V15") are mixed in and finally 1.5 parts by weight of 3-aminopropyltrimethoxysilane are added. After homogenization in vacuo, the compound thus obtained is filled into moisture-tight containers and allowed to crosslink after the storage time stated in table 1, as described in example 1.

The results for the storage and vulcanization behavior are shown in table 1.

COMPARATIVE EXAMPLE 3

In a planetary mixer having vacuum equipment, 55.4 parts by weight of a polydimethylsiloxane having —OSi(OCH$_3$)$_2$(CH$_3$) terminal groups, which has a viscosity of 80,000 mPa·s, are mixed with 31.2 parts by weight of a polydimethylsiloxane having —OSi(CH$_3$)$_3$ terminal groups and a viscosity of 100 mPa·s and 4.0 parts by weight of methyltrimethoxysilane and 0.2 part by weight of a tin compound, which was prepared by reacting 4 parts of tetraethoxysilane with 2.2 parts of dibutyltin diacetate, and 0.3 part by weight of benzenephosphonic acid (saturated solution in methyltrimethoxysilane) in the absence of water and are stirred for 10 minutes. Thereafter, 8.0 parts by weight of pyrogenic silica having a BET surface area of 150 m²/g (commercially available from Wacker-Chemie GmbH under the trade name "WACKER HDK® V15") are mixed in and finally 1.5 parts by weight of 3-aminopropyltrimethoxysilane are added. After homogenization in vacuo, the compound thus obtained is filled into moisture-tight containers and allowed to crosslink after the storage time stated in table 1, as described in example 1.

The results for the storage and vulcanization behavior are shown in table 1.

TABLE 1

|  | Vulcanization good after x days Storage at 100° C. | Skin formation time/Shore A hardness after 0 d/100° C. | Skin formation time/Shore A hardness after 1 d/100° C. | Skin formation time/Shore A hardness after 2 d/100° C. | Skin formation time/Shore A hardness after 3 d/100° C. |
|---|---|---|---|---|---|
| Example 1 | 7 | 15/21 | 18/19 | 18/18 | 19/18 |
| Example 2 | 6 | 17/21 | 24/19 | 18/17 | 20/17 |
| Comp. example 1 | 3 | 10/21 | 12/9 | 15/2 | No vulcanization |
| Comp. example 2 | 3 | 15/15 | 18/15 | 28/12 | 30/8 |
| Example 5 | 8 | 15/21 | 18/19 | 18/17 | 19/16 |
| Comp. example 3 | 2 | 25/16 | 23/10 | 80/4 | No vulcanization |

The invention claimed is:

1. A crosslinkable material based on organosilicon compounds having at least two hydrolyzable groups, wherein at least one organotin compound (C) is contained as a catalyst, said organotin compound (C) comprising the reaction product of phosphorus compounds (i) having C—P(=O) (OH) units and sulfur compounds (ii) having —SO₃H groups and tin compounds (iii) containing units of the formula $$R_a(XR')_b SnX_{(4-a-b)/2}$$ (III)

in which
  R are identical or different and are monovalent, optionally substituted hydrocarbon radicals optionally interrupted by oxygen atoms,
  X are identical or different and are —O— or —S—,
  R' are identical or different and are a hydrogen atom or a monovalent, optionally substituted hydrocarbon radical optionally interrupted by oxygen atoms or by optionally substituted silyl radicals,
  a is 0, 1, 2, or 3 and
  b is 0, 1, 2, or 3,
  with the proviso that the sum a+b is less than or equal to 4,
  said crosslinkable material further comprising at least one amino-funtional organosilicon compound (D).

2. The material of claim 1 wherein said amino-funtional organosilicon compound (D) is an organosilicon compound of the formula $$(R^9O)_{4-g}SiR^{10}{}_g$$ (IV)

in which
  R⁹ are identical or different and have the meanings mentioned above for R',
  R¹⁰ are identical or different and are monovalent, optionally substituted hydrocarbon radicals containing basic nitrogen,
  g is 1, 2, 3, or 4,
  and the partial hydrolysis products thereof.

3. A crosslinkable material, comprising:
  (A) at least one diorganopolysiloxane of the formula (V), $$(R^5O)_{3-d}R^6{}_dSiO—[R^6{}_2SiO]_e—SiR^6{}_d(OR^5)_{3-d}$$ (V)

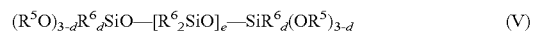

in which
  d is 0, 1, or 2,
  R⁶ are identical or different SiC-bonded hydrocarbon radicals having 1 to 18 carbon atoms, optionally substituted by halogen atoms, ether groups, ester groups, epoxy groups, mercapto groups, cyano groups, amino groups or (poly)glycol radicals, said (poly)glycol radicals being comprised of oxyethylene and/or oxypropylene units,
  R⁵ are identical or different and are a hydrogen or a monovalent, optionally substituted hydrocarbon radical optionally interrupted by oxygen atoms or by optionally substituted silyl radicals,
  e is an integer from 10 to 10,000, with the proviso that when d is 2, R⁵ is a hydrogen atom,
  (B) optionally, crosslinking agents of the formula (VI) and/or the partial hydrolysis products thereof, $$(R^7O)_{4-f}SiR^8{}_f$$ (VI)

in which
  R⁷ are identical or different and have one of the meanings mentioned above for R',
  R⁸ has the meaning mentioned above for R,
  f is 0 or 1,
  and the partial hydrolysis products thereof,
  (C) at least one organotin catalyst comprising the reaction product of phosphorus compounds (i) having C—P (=O) (OH) units and sulfur compounds (ii) having —SO₃H groups and tin compounds (iii) containing units of the formula $$(R_a(XR')_b SnX_{(4-a-b)/2}$$ (III)

in which
  R are identical or different and are monovalent, optionally substituted hydrocarbon radicals optionally interrupted by oxygen atoms,
  X are identical or different and are —O—or —S—,
  R' are identical or different and are a hydrogen atom or a monovalent, optionally substituted hydrocarbon radical optionally interrupted by oxygen atoms or by optionally substituted silyl radicals, a is 0, 1, 2, or 3 and b is 0, 1, 2, or 3, with the proviso that the sum a+b is less than or equal to 4, and (D) a compound of the formula (IV) having basic nitrogen

in which

R$^9$ are identical or different and have one of the meanings mentioned above for R', R$^{10}$ are identical or different and are monovalent, optionally substituted hydrocarbon radicals containing basic nitrogen, g is 1, 2, 3, or 4, and the partial hydrolysis products thereof.

4. The material of claim 3, wherein the crosslinkable materials comprise (A) 100 parts by weight of polydiorganosiloxane of the formula (V), (B) from 0.01 to 20 parts by weight of the crosslinking agents of the formula (VI) and/or the partial hydrolysis products thereof, (C) from 0.05 to 3 parts by weight of organotin compound, (D) from 0.01 to 4 parts by weight of a compound of the formula (IV) having basic nitrogen, (E) from 0 to 300 parts by weight of plasticizers, (F) from 0 to 300 parts by weight of fillers, (G) from 0 to 50 parts by weight of adhesion promoters and (H) from 0 to 100 parts by weight of additives.

5. A molding produced by crosslinking a crosslinkable material of claim 3.

6. A molding produced by crosslinking a crosslinkable material of claim 4.

* * * * *